United States Patent [19]

Mochizuki

[11] Patent Number: 5,049,603
[45] Date of Patent: Sep. 17, 1991

[54] POLYESTER RESIN COMPOSITION AND MOLDED ARTICLES THEREOF

[75] Inventor: Mitsuhiro Mochizuki, Shizuoka, Japan

[73] Assignee: Polyplastics Co., Ltd., Osaka, Japan

[21] Appl. No.: 512,200

[22] Filed: Apr. 20, 1990

[30] Foreign Application Priority Data

May 8, 1989 [JP] Japan .................................. 1-114769

[51] Int. Cl.$^5$ .............................................. C08K 5/527
[52] U.S. Cl. ...................................... 524/97; 524/120
[58] Field of Search .................. 524/94, 95, 102, 120, 524/97

[56] References Cited

U.S. PATENT DOCUMENTS

| | | | |
|---|---|---|---|
| 4,385,145 | 5/1983 | Horn | 524/120 |
| 4,499,219 | 2/1985 | Buxbaum et al. | 524/94 |
| 4,954,541 | 9/1990 | Nakane et al. | 524/95 |

FOREIGN PATENT DOCUMENTS

| | | |
|---|---|---|
| 0323045 | 7/1989 | European Pat. Off. |
| 56-120757 | 9/1981 | Japan . |
| 57-92046 | 6/1982 | Japan . |
| 62-230844 | 10/1987 | Japan . |
| 63-113066 | 5/1988 | Japan . |
| 63-118360 | 5/1988 | Japan . |
| 63-248852 | 10/1988 | Japan . |
| 1-06054 | 1/1989 | Japan . |
| 2-119011 | 5/1990 | Japan . |

Primary Examiner—Veronica P. Hoke
Attorney, Agent, or Firm—Depaoli & O'Brien

[57] ABSTRACT

The polyester comopsition is improved in properties at low and high temperatures and is prepared by mixing 100 parts by weight of a mixture comprising (A) 60 to 99 parts by weight of a crystalline thermoplastic polyester resin and (B) 1 to 40 parts by weight of a polyester elastomer with (C) 0.01 to 5 parts by weight of a bisoxazoline compound, (D) 0.01 to 5 parts by weight of a phosphorus compound represented by the general formula:

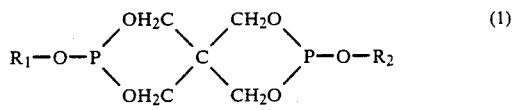

(1)

wherein $R_1$ and $R_2$ may be the same or different from each other and are each a group selected from among alkyl, substituted alkyl, aryl, substituted aryl and alkoxy groups, and (E) 0.01 to 5 parts by weight of one or more antioxidants selected from among thio ether compounds and hindered phenol compounds.

8 Claims, No Drawings

POLYESTER RESIN COMPOSITION AND MOLDED ARTICLES THEREOF

BACKGROUND OF THE INVENTION

The present invention relates to a polyester resin composition and a molded article thereof. More particularly, the present invention is directed to a polyester resin composition which has excellent toughness at low temperature and has improved heat stability and long-term stability in high-temperature service, in particular, resistance to discoloration, and which is useful for the preparation of a connector, switch or relay for automobiles or electrical appliances.

Crystalline thermoplastic polyester resins represented by polyalkylene terephthalates have been used as engineering plastics in various fields including automotive parts and electrical and electronic components by virtue of the excellent mechanical and electrical properties, excellent physical and chemical characteristics and good processability thereof. As the enlargement and diversification of the use of these resins have proceeded, however, polyalkylene terephthalates have been frequently required to show enhanced and specialized performance. For example, applications have increased where high heat stability, in particular, long-term stability of quality at high or low temperature is required.

More specifically, it is required in automotive fields from the standpoint of safety that the resin have excellent mechanical properties such as flexibility and impact resistance at low temperature and retain these excellent physical properties even after long-term service at high temperature.

In order to satisfy the above requirements, it has been proposed to add polycarbonate or thermoplastic elastomer such as an olefinic polymer or rubbery polymer to a thermoplastic polyester resin and simultaneously add an epoxy resin or polycarbodiimide. However, a polyester resin composition thus prepared containing an elastomer and an additive as described above is subject to surface peeling owing to poor compatibility and is problematic in that discoloration occurs in long-term service at high temperature. Accordingly, the utilization thereof is very limited, although the resin composition has somewhat improved mechanical properties.

For the purpose of overcoming the discoloration problem, it has also been proposed to add a stabilizer such as a specific phenol, amine, phosphate or phosphite compound to the polyester composition. Although the addition of a stabilizer is somewhat effective in depressing the discoloration, the effect is too insufficient to satisfy the performance as required of a connector for automobiles or electrical appliances, including high toughness (particularly, at low temperature) such as flexibility and impact resistance and excellent heat stability and long-term stability of quality at high temperature, in particular, resistance to discoloration. Accordingly, there is still an eager desire to solve the performance problems.

SUMMARY OF THE INVENTION

The present invention obtains a polyester resin composition which has improved heat stability, in particular, resistance to discoloration in long-term service at high temperature, without adversely affecting the mechanical properties essentially required of a connector or the like, particularly toughness and moldability. The addition of specific compounds to a polyester resin is effective for this purpose.

Accordingly, the present invention relates to a polyester resin composition prepared by mixing:

(A) 60 to 99 parts by weight of a crystalline thermoplastic polyester resin and (B) 1 to 40 part- by weight of a polyester elastomer, with per 100 parts weight of A and B, (C) 0.01 to 5 parts by weight of a bisoxazoline compound, (D) 0.01 to 5 parts by weight of a phosphorus compound represented by the general formula:

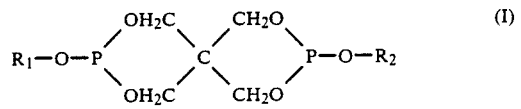

wherein R and Rz may be the same or different from each other and are each a group selected from among alkyl, substituted alkyl, aryl, substituted aryl and alkoxy groups, and (E) 0.01 to 5 parts by weight of one or more antioxidants selected from among thio ether compounds and hindered phenol compounds. The composition can be used to form a molded article thereof such as a connector, switch or relay.

DETAILED DESCRIPTION OF THE INVENTION

The components constituting the composition of the present invention will be described successively in more detail.

The crystalline thermoplastic polyester resin (A) to be used in the present invention is crystalline polyester prepared by the polycondensation of a dicarboxylic acid with a low-molecular weight dihydroxyl compound, that of a hydroxy carboxylic acid or that of these three compounds. The polyester may be either a homopolymer or a copolymer, both of which exhibit the effect of the present invention.

Examples of the dicarboxylic acid to be used in the preparation of the polyester resin (A) include known dicarboxylic acids such as terephthalic, isophthalic, naphthalenedicarboxylic, diphenyl-dicarboxylic, diphenyl ether dicarboxylic, diphenylethanedicarboxylic and cyclohexanedicarboxylic acids and alkyl-, alkoxy- or halogen-substituted derivatives thereof. These dicarboxylic acids may be each used as an ester-forming derivative, for example, an ester thereof with a lower alcohol, such as dimethyl ester thereof. Further these dicarboxylic acids and derivatives thereof may be used also as a mixture of two or more of them.

Examples of the dihydroxyl compound constituting the crystalline thermoplastic polyester resin (A) according to the -resent invention include dihydroxyl compounds such as ethylene glycol, propylene glycol, butanediol, neopentyl glycol, hydroquinone, resorcinol, dihydroxyphenyl, naphthalenediol, dihydroxydiphenyl ether, cyclohexanediol, 2,2-bis(4-hydroxyphenyl)propane and diethoxylated bisphenol A and alkyl-, alkoxy- or halogen-substituted derivatives thereof. These compounds may be used alone or as a mixture of two or more of them.

Examples of the hydroxy carboxylic acid include hydroxycarboxylic acids themselves such as hydroxybenzoic, hydroxynaphthoic and diphenylenehydroxycarboxylic acids and alkyl-, alkoxy- or halogen-substituted derivatives thereof. Further, ester-forming derivatives of these compounds may be used. According to the present invention, one or more of the compounds described above may be used.

According to the present invention, a small amount of a trifunctional monomer may be used in addition to the above components to thereby prepare a polyester having a branched or crosslinked structure. The trifunctional monomer includes, trimellitic, trimesic and pyromellitic acids, pentaerythritol and trimethylolpropane.

According to the present invention, any crystalline thermoplastic polyester prepared by the polycondensation of monomer components as described above may be used as the component (A). Although the crystalline thermoplastic polyester resins thus prepared may be used alone or as a mixture of two or more of them, it is preferable to use a polymer mainly comprising polyalkylene terephthalate, still preferably polybutylene terephthalate.

The polyester elastomer (B) to be used in the present invention is a copolymer comprising a polyester hard segment and a polyether soft segment having a number-average molecular weight of about 200 to 6000 at a weight ratio between 15:85 and 90:10. The dicarboxylic acid component constituting the polyester hard segment includes aromatic dicarboxylic acids such as terephthaic, isophthalic, phthalic and 2,6- and 1,5-naphhalenedicarboxylic acids and bis(p-carboxyphenyl)methane; alicyclic dicarboxylic acids such as 1,4-cyclohexanedicarboxylic and cyclopentanedicarboxylic acids; and aliphatic dicarboxylic acids such as adipic and sebacic acids. It is preferred in respect of mechanical properties and heat resistance to use a dicarboxylic acid component comprising at least 50 mole % of an aromatic dicarboxylic acid, still preferably terephthalic or isophthalic acid.

The diol component constituting the hard segment includes $C_{2-12}$ aliphatic or alicyclic diols such as ethylene glycol, propylene glycol, 1,4-butanediol, 1,4-butenediol, neopentyl glycol, 1,5-pentanediol and 1,6-hexanediol; bisphenols such as bis(p-hydroxy)-diphenyl, bis(p-hydroxyphenyl)methane and bis(p-hydroxyphenyl)propane; and mixtures thereof. Particularly, it is preferable to use a $C_{2-8}$ aliphatic or alicyclic diol.

The poly(alkylene oxide) glycol constituting the polyester soft segment includes poly(ethylene oxide) glycol, poly(1,3- and 1,2-propylene oxide) glycol, poly(tetramethylene oxide) glycol, polyethylene oxide glycol-polypropylene oxide glycol block copolymer and polyethylene oxide glycol-poly(tetramethylene oxide) glycol block copolymer Particularly, it is preferable to use poly(tetramethylene oxide) glycol Of course, these compounds may be also used as a mixture of two or more of them. These polyether glycols each have an average molecular weight of about 200 to 6000.

These polyester elastomers can be each prepared by an arbitrary process and some of them are commercially available.

According to the present invention, the weight ratio of the crystalline thermoplastic polyester resin (A) to the polyester elastomer (B) is between 60:40 and 99:1, preferably between 70:30 and 97:3.

When the amount of the polyester elastomer exceeds 40 parts by weight, the resulting resin composition will exhibit lowered stiffness, while when it is less than 1 part by weight, the impact resistance will not sufficiently be improved.

The bisoxazoline compound (C) to be used in the present invention is a compound represented by the general formula:

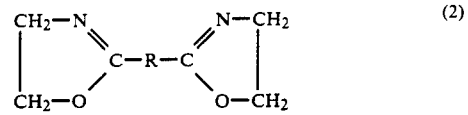

(2)

wherein R is a divalent organic group and one or more of the hydrogen atoms may be each replaced by an alkyl or aryl group.

Particular examples of the bisoxazoline compound (C) represented by the general formula (2) include 2,2'-methylenebis(2-oxazoline), 2,2'-ethylenebis(2-oxazoline), 2,2'-ethylenebis(4-methyl-2-oxazoline), 2,2'-propylenebis(2-oxazoline), 2,2'-tetramethylene-bis(2-oxazoline), 2,2'-hexamethylenebis(2-oxazoline), 2,2'-octamethylenebis(2-oxazoline), 2,2'-p-phenylene-bis(2-oxazoline), 2,2'-p-phenylenebis(4-methyl-2-oxyazoline), 2,2'-p-phenylenebis(4,4-dimethyl-2-oxazoline), 2,2'-p-phenylenebis(4-phenyl-2-oxazoline), 2,2'-m-phenylenebis(2-oxazoline), 2,2'-m-phenylenebis-(4-methyl-2-oxazoline), 2,2'-m-phenylenebis(4,4-dimethyl-2-oxazoline), 2,2'-m-phenylenebis(4-phenyl-2-oxazoline), 2,2'-o-phenylenebis(2-oxazoline), 2,2'-phenylenebis (4-methyl-2oxazoline), 2,2'-bis(2-oxazoline), 2,2'-bis(4-methyl-2-oxazoline), 2,2'-bis(4-ethyl-2-oxazoline) and 2,2'-bis(4-phenyl-2-oxazoline). These oxazoline compounds may be used alone or as a mixture of two or more of them.

Among the above bisoxazoline compounds, it is preferable to use a compound represented by the general formula (2) wherein R is an aromatic group, still preferably a phenylene group. Particularly, 2,2'-m-phenylenebis(2-oxazoline) and 2,2'-p-phenylene-bis(2-oxazoline) are preferred.

The amount of the bisoxazoline compound (C) is 0.01 to 5 parts by weight, preferably 0.03 to 3 parts by weight per 100 parts by weight of a mixture comprising the components (A) and (B). When the amount is too small, no effect will be exhibited, while when it is too large, the resulting composition will exhibit a remarkably increased viscosity and will cause problems such as discoloration in long-term service.

Generally, it is well known that the addition of a bisoxazoline compound as described above as the component (C) is an effective means for inhibiting the decomposition of a polyester resin at high temperature to thereby retain the toughness such as flexibility and impact resistance for a prolonged period of time. As described above, however, a polyester resin composition containing a bisoxazoline compound has a problem of causing significant discoloration in long-term service at high temperature.

Moreover, the composition of the present invention is characterized by containing (D) a specific phosphorus compound and (E) an antioxidant selected from among thio ether compounds and hindered phenol compounds in addition to the above components (A), (B) and (C). Namely, it has now been found that the combination of the components (A), (B), (C), (D) and (E) is effective in improving the retentivity of initial characteristics and the resistance to discoloration in long-term service at high temperature without lowering the toughness and long-term retentivity of physical properties at low temperature.

The specific phosphorus compound (D) to be used for the purpose described above is a compound represented by the general formula:

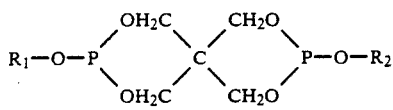

(1)

In the general formula (1), $R_1$ and $R_2$ may be the same or different from each other and are each a group selected from among alkyl, substituted alkyl, aryl, substituted aryl groups. It is preferable from the standpoint of stability in processing that $R_1$ and $R_2$ be each an alkyl group having at least six carbon atoms or a substituted alkyl, alkoxy, aryl or substituted aryl group, still preferably, an aryl or substituted aryl group. Examples thereof include phenyl, naphthyl and diphenyl groups and alkyl-, hydroxyl- and/or alkoxy-substituted derivatives thereof. Particular examples of the compound (D) include bis(2,4-di-t-butylphenyl) pentaerythritol diphosphite, bis(nonylphenyl) pentaerythritol diphosphite and 4-phenoxy-9-α-(4-hydroxyphenyl)-p-cumenyloxy-3,5,8,10-tetraoxa-4,9-diphosphaspiro[5.5]-undecane.

According to the present invention, these specific phosphorus compounds may be used alone or as a mixture of two or more of them in an amount of 0.01 to 5 parts by weight per 100 parts by weight of a mixture comprising the crystalline thermoplastic polyester resin (A) and the polyester elastomer (B). When the amount of the phosphorus compound (D) is less than 0.01 part by weight, the resistance to discoloration will hardly be improved, even when used together with the antioxidant (E) which will be described below. On the contrary, the use thereof in an amount exceeding 5 parts by weight is not only uneconomical, because the effect of improving the heat stability reaches a saturation even with the use thereof in an amount less than 5% by weight, but also disadvantageous in that the moldability and the strength are unnegligibly lowered. It is preferred from the standpoint of the improvement effect on heat stability, various physical properties and economical efficiency that the amount be 0.03 to 3 parts by weight, still preferably 0.05 to 1.0 part by weight.

Even when the specific phosphorus compound (D) described above is alone added to a resin composition comprising a crystalline thermoplastic polyester resin, a polyester elastomer and a bisoxazoline compound, the objective effect according to the present invention will be insufficient That is, the improvement in the resistance to discoloration in long-term service at high temperature which is an object of the present invention is attained by the synergistic effect resulting from the use of the compound (D) together with a specific antioxidant (E) selected from among thio ether compounds and hindered phenol compounds which will be described below.

Representative examples of the thio ether compound (E) to be used for the above object include dilauryl thiodipropionate, dimyristyl thiodipropionate, distearyl thiodipropionate, lauryl stearyl thiodipropionate, tetrakis[methylene-3-(dodecylthio) propionate]methane, and dialkyl ($C_{12\sim18}$) 3,3-thiodipropionate.

Examples of the hindered phenol compound (E) include 2,2'-methylenebis(4-methyl-6-t-butylphenol), hexamethylene glycol bis(3,5-di-t-butyl-4-hydroxyhydrocinnamate), tetrakis[methylene(3,5-di-t-butyl-4-hydroxyhydrocinnamate)]methane, triethylene glycol bis-3-(3-t-butyl-4-hydroxy-5-methylphenyl)propionate, 1,3,5-trimethyl-2,4,6-tris(3,5-di-t-butyl-4-hydroxybenzyl)benzene, n-octadecyl 3-(4'-hydroxy-3',5'-di-t-butylphenol)propionate, 4,4'-methylenebis(2,6-di-t-butylphenol), 4,4'-butylidenebis(6-t-butyl-3-methylphenol), 2,2'-thiodiethyl bis[3-(3,5-di-t-butyl-4-hydroxyphenyl)-propionate, distearyl 3,5-di-t-butyl-4-hydroxybenzylphosphonate and 2-t-butyl-6-(3-t-butyl-5-methyl-2-hydroxybenzyl)-4-methylphenyl acrylate. These compounds may be use alone or as a mixture of two or more of them. Among them, it is preferable to use hexamethylene glycol bis(3,5-di-t-butyl-4-hydroxyhydrocinnamate), tetrakis[methylene(3,5-di-t-butyl-4-hydroxyhydrocinnamate)]methane or triethylene glycol bis-3-(3-t-butyl-4-hydroxy-5-methylphenyl)propionate.

Although the effect of depressing the discoloration according to the present invention can be attained sufficiently by using either a thio ether compound or a hindered phenol compound as the component (E), the combination of a thioether compound with the specific phosphorus compound (D) is still preferable for the objective effect of the present invention The amount of the antioxidant (E) is 0.01 to 5 parts by weight, preferably 0.01 to 3 parts by weight, still preferably 0.03 to 1.0 part by weight per 100 parts by weight of a mixture comprising the crystalline thermoplastic polyester resin (A) and the polyester elastomer (B). When the amount is less than 0.01 part, the effect of depressing the discoloration will be insufficient, while when it exceeds 5 parts by weight, the mechanical properties of the composition will be adversely affected The resin composition according to the present invention may further contain a small amount of other thermoplastic resins as an auxiliary component, as far as the object of the present invention is not hindered. The thermoplastic resin to be used as an auxiliary component may be any one which is stable at high temperature.

Examples of the thermoplastic resin include polyamide, ABS, polyphenylene oxide, polyalkyl acrylate, polyacetal, polysulfone, polyester sulfone, polyether imide, polyether ketone and fluororesins, which may be also used as a mixture of two or more of them.

Further, the resin composition of the present invention may further contain a known additive for a thermoplastic or thermosetting resin for the purpose of imparting the characteristics desired depending upon the object to the composition. Examples of the additive include ultraviolet absorber, antistatic agent, flame retardant, auxiliary flame retardant, lubricant, mold release agent, coloring agents such as dye and pigment, lubricating agent, plasticizer, crystallization accelerator, nucleating agent and inorganic filler.

In particular, electrical components and automotive parts are often required to be flame-retardant in the service environment thereof, so that the addition of a flame retardant and an auxiliary flame retardant is essential to the preparation thereof.

The flame retardant may be any known halogenated one and examples thereof include brominated polycarbonate, brominated epoxy compounds, brominated diphenyl and brominated diphenyl ethers.

The auxiliary flame retardants include antimony compounds such as antimony trioxide and antimony halides; zinc or bismuth compounds; magnesium hydroxide and clayey silicates such as asbestos.

The inorganic filler includes conventional inorganic fibers such as glass, carbon, ceramic, boron and potassium titanate fibers and asbestos; powdery or granular fillers such as calcium carbonate, highly dispersible silicate, alumina, aluminum hydroxide, talc, clay, mica, glass flake, glass powder, glass bead, quartz powder, quartz sand, wollastonite, carbon black, barium sulfate, plaster of Paris, silicon carbide, alumina, boron nitride and silicon nitride; flaky fillers and whiskers.

These inorganic fillers may be used alone or as a mixture of two or more of them.

The composition of the present invention can be easily prepared by any known process used for the preparing resin compositions with known equipment therefor. Such processes include (i) one which comprises mixing the components with each other to obtain a mixture, kneading the mixture in an extruder, extruding it into pellets and molding the pellets, (ii) one which comprises preparing pellets having compositions different from each other, mixing the pellets with each other in a predetermined ratio and molding the obtained pellet mixture into a molded article having an objective composition and (iii) one characterized by directly feeding one or more of the components. Further, it is effective in mixing the components with each other homogeneously that a part of the resinous components be preliminarily ground and mixed with the residual components.

Furthermore, the whole or a part of the specific phosphorus compound which is an essential component according to the present invention, and occasionally, the thio ether or bindered phenol compound may be added at an arbitrary step in the course of the preparation and processing of the thermoplastic polyester resin.

The polyester resin composition of the present invention may be molded into various articles requiring high toughness such as high flexibility and impact resistance, particularly, at low temperature and excellent heat stability. Particularly, when the composition is applied to an automotive part or an electrical component, particularly a connector, switch or relay which is used in a severe environment, the composition has an extremely high value, because the resulting part or component can withstand the stress repeatedly applied by the operation of a junction terminal.

As described above, the resin composition of the present invention has remarkably improved heat stability and long-term stability of quality (particularly resistance to discoloration) in high-temperature service as compared with the polyester resin compositions containing an impact modifier according to the prior art, without adversely affecting the mechanical properties and moldability, and is excellent in toughness at low temperature.

The resin composition of this invention exhibits little lowering in toughness and little change in hue resulting form thermal history and is excellent in appearance, so that it is favorably used for the preparation of automotive parts or electrical components used in high-temperature environments, for example connector, switch or relay.

EXAMPLES

The present invention will now be describe din more detail by referring to the following Examples, though it is not limited to them.

The methods for evaluation of characteristics used therein are as follows:

① Change of hue

A test piece for hue measurement was stored in a thermostatic chamber of 150° C. for 200 hours and the hue of the resulting test piece was measured with a colorimeter mfd. by Nippon Denshoku K.K. to determine the change of hue according to the following equation:

$$\text{change of hue } (\Delta E) = \sqrt{(L - L_o)^2 + (a - a_o)^2 + (b - b_o)^2}$$

wherein $L_o$, $a_o$, $b_o$: initial hue

L, a, b: hue after heating

② Tensile elongation

An ASTM test piece (type IV, thickness: 1 mm) was examined for initial elongation and elongation after heating at 150° C. for 200 hours according to ASTM D638.

measurement temperature: 23° C. and 0° C.

EXAMPLES 1 TO 8 AND COMPARATIVE EXAMPLES 1 TO 14

95 parts by weight of polybutylene terephthalate having an intrinsic viscosity of 0.8 as the component (A), 5 parts by weight of a polyether-ester block copolymer as the component (B), 1,3-phenylenebis(2-oxazoline) (mPBO) as the bisoxazolien compound (C) and a phosphorus compound and antioxidant given in Table 1 as the components (D) and (E) respectively were mixed with each other to obtain a mixture. This mixture was pelletized with an extruder and injection molded into a test piece. This test piece was examined for characteristics. The results are shown in Table 1.

For comparison, the same mixture as that prepared above was prepared except that no compound (C) was contained, that either of the components (D) and (E) was contained, that neither the component (D) nor the component (E) was contained or that a phosphorus compound (D') outside the scope of the present invention was contained instead of the compound (D). The mixtures thus prepared were each processed and examined in a similar manner to that described above. The results are also shown in Table 1. EXAMPLES 9 TO 14 AND COMPARATIVE EXAMPLES 15 TO 24

The same polybutylene terephthalate (A) as that used in Example 1 was mixed with a polyester elastomer (B), bisoxazoline compound (C), phosphorus compound (D) and antioxidant (E) given in Table 2 in a ratio given in Table 2 to obtain a mixture. The mixtures thus prepared were each examined in a similar manner to that described in Example 1. The results are shown in Table 2.

As Comparative Examples, the same mixture as those prepared above were prepared except that either of the components (D) and (E) was contained or that a phosphorus compound (D') outside the scope of the present invention was contained instead of the compound (D). The obtained mixtures were each examined in a similar manner to that of the foregoing Examples The results are also shown in Table 2.

TABLE 1

| | Composition | | | (E) thio ether or hindered phenol compound[4] (parts by weight) | Tensile elongation (%) | | | Hue | |
|---|---|---|---|---|---|---|---|---|---|
| | (B) polyester elastomer[1] (parts by weight) | (C) bisoxazoline compound[2] (parts by weight) | (D) phosphorus compound[3] (parts by weight) | | initial | | after heating (150° C. & 200 hrs) meas. temp.: 23° C. | initial $L_o/a_o/b_o$ | change of hue after heating (150° C. & 200 hrs) ($\Delta E$) |
| | | | | | meas. temp. 0° C. | meas. temp. 23° C. | | | |
| Example | | | | | | | | | |
| 1 | B-1 (5) | m PBO (0.2) | D-1 (0.2) | E-1 (0.2) | 100 | 195 | 115 | 90.5 −0.4 4.3 | 2.2 |
| 2 | B-1 (5) | m PBO (0.2) | D-1 (0.2) | E-2 (0.2) | 95 | 180 | 110 | 90.1 −0.4 4.2 | 3.5 |
| 3 | B-1 (5) | m PBO (0.2) | D-1 (0.2) | E-3 (0.2) | 95 | 190 | 110 | 90.5 −0.4 5.0 | 3.8 |
| 4 | B-1 (5) | m PBO (0.5) | D-1 (0.2) | E-1 (0.2) | 85 | 160 | 125 | 90.0 −0.5 4.1 | 2.5 |
| 5 | B-1 (5) | m PBO (0.2) | D-1 (0.5) | E-1 (0.2) | 78 | 185 | 115 | 90.2 −0.5 5.2 | 2.1 |
| 6 | B-1 (5) | m PBO (0.2) | D-1 (0.2) | E-1 (0.5) | 102 | 185 | 110 | 88.9 −0.5 4.5 | 2.1 |
| 7 | B-1 (5) | m PBO (0.2) | D-2 (0.2) | E-1 (0.2) | 98 | 180 | 105 | 90.5 −0.5 3.9 | 1.6 |
| 8 | B-1 (5) | m PBO (0.2) | D-2 (0.2) | E-3 (0.2) | 105 | 180 | 110 | 89.0 −0.5 5.0 | 3.5 |
| Comp. Example | | | | | | | | | |
| 1 | B-1 (5) | — | — | — | 105 | 190 | 15 | 90.5 −0.4 4.8 | 5.0 |
| 2 | B-1 (5) | m PBO (0.2) | — | — | 100 | 185 | 80 | 90.0 −0.4 4.6 | 8.7 |
| 3 | B-1 (5) | m PBO (0.2) | D-1 (0.2) | — | 88 | 170 | 95 | 89.0 −0.4 5.1 | 8.5 |
| 4 | B-1 (5) | m PBO (0.2) | — | E-1 (0.2) | 98 | 175 | 85 | 91.0 −0.5 6.1 | 6.5 |
| 5 | B-1 (5) | m PBO (0.2) | — | E-2 (0.2) | 100 | 180 | 78 | 90.5 −0.5 5.7 | 7.0 |
| 6 | B-1 (5) | m PBO (0.2) | — | E-3 (0.2) | 88 | 172 | 80 | 91.0 −0.4 5.1 | 7.5 |
| 7 | B-1 (5) | m PBO (0.2) | D' (0.2) | E-1 (0.2) | 87 | 165 | 75 | 90.6 −0.4 5.0 | 6.9 |
| 8 | B-1 (5) | m PBO (0.2) | D' (0.2) | E-3 (0.2) | 85 | 160 | 75 | 90.5 −0.5 4.8 | 7.2 |
| 9 | B-1 (5) | m PBO (0.5) | D-1 (0.2) | — | 70 | 155 | 105 | 91.0 −0.5 4.6 | 8.9 |
| 10 | B-1 (5) | m PBO (0.5) | — | E-1 (0.2) | 72 | 150 | 110 | 89.0 −0.4 4.3 | 7.5 |
| 11 | B-1 (5) | m PBO (0.5) | D' (0.2) | E-1 (0.2) | 72 | 165 | 102 | 88.5 −0.4 4.9 | 7.7 |
| 12 | B-1 (5) | m PBO (0.2) | D-1 (0.5) | — | 88 | 170 | 100 | 90.2 −0.5 4.4 | 8.5 |
| 13 | B-1 (5) | m PBO (0.2) | — | E-1 (0.5) | 90 | 185 | 85 | 90.0 −0.5 5.5 | 6.2 |
| 14 | B-1 (5) | m PBO (0.2) | D-2 (0.2) | — | 90 | 180 | 98 | 89.9 −0.5 4.8 | 8.0 |

TABLE 2

| | | Composition | | | | Tensile elongation (%) | | | | Hue | | | |
|---|---|---|---|---|---|---|---|---|---|---|---|---|---|
| | | (B) polyester elastomer[1] | (C) bisoxazoline compound[2] | (D) phosphorus compound[3] | (E) thio ether or hindered phenol compound[4] | initial | | | after heating (150° C. & 200 hrs) meas. temp.: 23° C. | initial | | | change of hue after heating (150° C. & 200 hrs) (ΔE) |
| | | | | | | meas. temp. 0° C. | meas. temp. 23° C. | meas. temp. | | $L_0$ | $a_0$ | $b_0$ | |
| | | (parts by weight) | (parts by weight) | (parts by weight) | (parts by weight) | | | | | | | | |
| Example | 9 | B-1 (5) | p PBO (0.2) | D-1 (0.2) | E-1 (0.2) | 95 | 185 | | 105 | 90.5 | −0.5 | 4.8 | 2.3 |
| | 10 | B-1 (5) | p PBO (0.2) | D-1 (0.2) | E-3 (0.2) | 98 | 185 | | 105 | 89.0 | −0.6 | 5.1 | 4.2 |
| | 11 | B-1 (5) | p PBO (0.2) | D-2 (0.2) | E-1 (0.2) | 95 | 190 | | 110 | 91.2 | −0.5 | 5.1 | 2.0 |
| | 12 | B-2 (5) | p PBO (0.2) | D-1 (0.2) | E-1 (0.2) | 120 | 175 | | 115 | 89.9 | −0.5 | 5.2 | 2.3 |
| | 13 | B-2 (5) | m PBO (0.2) | D-1 (0.2) | E-1 (0.2) | 128 | 190 | | 115 | 90.8 | −0.5 | 5.1 | 2.1 |
| | 14 | B-2 (20) | m PBO (0.2) | D-2 (0.2) | E-1 (0.2) | 151 | 205 | | 118 | 88.0 | −0.3 | 5.3 | 3.9 |
| Comp. Example | 15 | B-1 (5) | p PBO (0.2) | D-1 (0.2) | — | 87 | 175 | | 95 | 91.0 | −0.5 | 5.2 | 8.6 |
| | 16 | B-1 (5) | p PBO (0.2) | — | E-1 (0.2) | 88 | 170 | | 98 | 90.2 | −0.5 | 5.7 | 6.5 |
| | 17 | B-1 (5) | p PBO (0.2) | D' (0.2) | E-1 (0.2) | 85 | 170 | | 98 | 90.2 | −0.5 | 4.9 | 6.7 |
| | 18 | B-1 (5) | p PBO (0.2) | — | E-3 (0.2) | 88 | 180 | | 100 | 91.1 | −0.5 | 5.2 | 7.2 |
| | 19 | B-1 (5) | p PBO (0.2) | D-2 (0.2) | — | 88 | 185 | | 102 | 89.1 | −0.5 | 6.1 | 8.0 |
| | 20 | B-2 (5) | p PBO (0.2) | — | — | 102 | 190 | | 110 | 89.8 | −0.4 | 4.8 | 8.4 |
| | 21 | B-2 (5) | p PBO (0.2) | D-1 (0.2) | E-1 (0.2) | 108 | 190 | | 105 | 90.3 | −0.4 | 5.1 | 6.5 |
| | 22 | B-2 (5) | m PBO (0.2) | D-1 (0.2) | — | 115 | 198 | | 105 | 90.6 | −0.5 | 5.0 | 8.3 |
| | 23 | B-2 (5) | m PBO (0.2) | — | E-1 (0.2) | 110 | 195 | | 100 | 91.0 | −0.5 | 5.0 | 6.5 |

TABLE 2-continued

| 24 | B-2 (5) | m PBO (0.2) | D' (0.2) | E-1 (0.2) | 110 | 190 | 108 | 91.2 | −0.5 | 5.3 | 6.8 |

Note[1]
B-1: polyester elastomer comprising a polybutylene terephthalate segment and a polytetramethylene oxide terephthalate segment.
B-2: polyester elastomer comprising a polybutylene terephthalate segment, a polybutene terephthalate segment and a polytetramethylene oxide terephthalate segment Note[2]
m PBO: 1,3-phenylenebis(2-oxazoline)
p PBO: 1,4-phenylenebis(2-oxazoline)

Note[3]

D-1: t-Bu (structure shown)
D-2: CH$_3$ (structure shown)
D': (structure shown)

Note[4]
E-1: R—S—CH$_2$CH$_2$—C(=O)—OCH$_2$—C(CH$_2$O—C(=O)—CH$_2$CH$_2$—S—R)$_2$—CH$_2$O—C(=O)—CH$_2$CH$_2$—S—R (R: C$_{12}$ alkyl)

E-2: distearyl thiodipropionate
E-3: tetrakis[methylene-3-(3,5-di-t-butyl-4-hydroxyphenyl)propionate]methane

What is claimed is:

1. A polyester resin composition prepared by mixing 100 parts by weight of a mixture comprising:
   (A) 60 to 99 parts by weight of a crystalline thermoplastic polyester resin and
   (B) 1 to 40 parts by weight of a polyester elastomer; and, per 100 parts by weight of (A) and (B),
   (C) 0.01 to 5 parts by weight of a bisoxazoline compound of the formula:

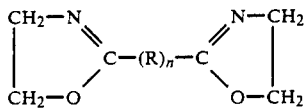

wherein one or more of the hydrogen atoms may each be replaced by an alkyl or aryl group, R is a divalent organic group, and n is 0 or 1;
   (D) 0.01 to 5 parts by weight of a phosphorus compound represented by the general formula:

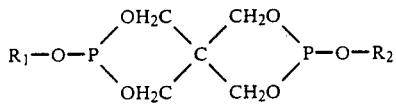

wherein $R_1$ and $R_2$ may be the same or different from each other and are each a group selected from among alkyl, substituted alkyl, aryl and substituted aryl; and
   (E) 0.01 to 5 parts by weight of one or more antioxidants selected from among thio ether compounds and hindered phenol compounds.

2. The polyester resin composition as set forth in claim 1 wherein said crystalline thermoplastic polyester resin (A) comprises a polyalkylene terephthalate.

3. The polyester resin composition as set forth in claim 2 wherein said polyalkylene terephthalate is polybutylene terephthalate.

4. The polyester resin composition as st forth in claim 1 or 3 wherein the bisoxazoline compound (C) is m-phenylenebisoxazoline or p-phenylene-bisoxazoline.

5. The polyester resin composition as set forth in claim 1 wherein said crystalline thermoplastic polyester resin (A) is present in amounts of from 70 to 97 parts by weight an said polyester elastomer (B) is present in amounts of from 3 to 30 parts by weight.

6. The polyester resin composition as set forth in claim 1 wherein said $R_1$ and $R_2$ are aryl or substituted aryl.

7. A molded article for sue as a connector, switch or relay which is prepared by molding a polyester resin composition as set forth in either of claim 1 or 3.

8. A molded article for use as a connector, switch or relay which is prepared by molding a polyester resin composition as set forth in claim 4.

* * * * *